United States Patent
Wang et al.

(10) Patent No.: US 10,406,520 B2
(45) Date of Patent: Sep. 10, 2019

(54) SYSTEM AND DEVICE FOR HIGH THROUGHPUT GENERATION OF COMBINATORIAL DROPLETS AND METHODS OF USE

(71) Applicant: The Johns Hopkins University, Baltimore, MD (US)

(72) Inventors: Tza-Huei Wang, Timonium, MD (US); Tushar Dnyandeo Rane, Los Angeles, CA (US); Helena Claire Zec, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 15/112,334

(22) PCT Filed: Jan. 26, 2015

(86) PCT No.: PCT/US2015/012927
§ 371 (c)(1),
(2) Date: Jul. 18, 2016

(87) PCT Pub. No.: WO2015/112985
PCT Pub. Date: Jul. 30, 2015

(65) Prior Publication Data
US 2016/0332163 A1    Nov. 17, 2016

Related U.S. Application Data

(60) Provisional application No. 61/931,516, filed on Jan. 24, 2014.

(51) Int. Cl.
*C40B 60/08* (2006.01)
*B01L 3/00* (2006.01)
(Continued)

(52) U.S. Cl.
CPC ..... *B01L 3/502784* (2013.01); *B01J 19/0046* (2013.01); *B01L 3/502715* (2013.01);
(Continued)

(58) Field of Classification Search
None
See application file for complete search history.

(56) References Cited

U.S. PATENT DOCUMENTS

2005/0032240 A1    2/2005  Lee et al.
2005/0175135 A1    8/2005  Jones et al.
(Continued)

FOREIGN PATENT DOCUMENTS

WO    WO-2006-076390    7/2006
WO    WO-2013-140846    9/2013

OTHER PUBLICATIONS

Brouzes et al., "Droplet microfluidic technology for single-cell high-throughput screening," PNAS Aug. 25, 2009, vol. 106 No. 34 pp. 14195-14200.
(Continued)

*Primary Examiner* — Paul S Hyun
(74) *Attorney, Agent, or Firm* — Venable LLP; Henry J. Daley; Miguel A. Lopez

(57) ABSTRACT

The present invention is directed to a microfluidic system comprising a microfluidic chip and a method of performing a chemical assay wherein a sample is processed into multiple daughter droplets and said daughter droplets are incubated with varying reagents. The properties of these droplets can be detected to provide assay data.

24 Claims, 10 Drawing Sheets

(51) Int. Cl.
*C40B 50/08* (2006.01)
*B01J 19/00* (2006.01)

(52) U.S. Cl.
CPC ........ *B01L 3/502738* (2013.01); *C40B 50/08* (2013.01); *C40B 60/08* (2013.01); *B01J 2219/00351* (2013.01); *B01J 2219/00418* (2013.01); *B01J 2219/00585* (2013.01); *B01J 2219/00599* (2013.01); *B01J 2219/00702* (2013.01); *B01L 2200/141* (2013.01); *B01L 2200/143* (2013.01); *B01L 2300/021* (2013.01); *B01L 2300/0864* (2013.01); *B01L 2300/0867* (2013.01); *B01L 2400/0666* (2013.01)

(56) References Cited

U.S. PATENT DOCUMENTS

| | | |
|---|---|---|
| 2005/0250200 A1 | 11/2005 | Nakajima et al. |
| 2007/0264320 A1 | 11/2007 | Lee et al. |
| 2007/0275455 A1 | 11/2007 | Hung et al. |
| 2008/0003142 A1 | 1/2008 | Link et al. |
| 2011/0059556 A1 | 3/2011 | Strey et al. |
| 2011/0086352 A1* | 4/2011 | Bashir ............... B01L 3/5027 435/6.11 |
| 2013/0165346 A1 | 6/2013 | Wang et al. |
| 2014/0026968 A1* | 1/2014 | Abate ............... B01L 3/502784 137/1 |
| 2015/0050721 A1 | 2/2015 | Asogawa et al. |

OTHER PUBLICATIONS

Huebner, et al., "Quantitative detection of protein expression in single cells using droplet microfluidics," Chem. Commun., Jan. 26, 2007, pp. 1218-1220.

Puleo, et al., "Coupling confocal fluorescence detection and recirculating microfluidic control for single particle analysis in discrete nanoliter volumes," Lab Chip, The Royal Society of Chemistry, Mar. 12, 2008, pp. 822-825.

International Search Report of International Application No. PCT/2015/012927 dated May 20, 2015.

Supplementary European Search Report issued in corresponding European Application No. 15739970.0, dated Aug. 21, 2017.

Examiner's Opinion issued in corresponding Chilean Application No. 201601867, dated Sep. 5, 2018.

\* cited by examiner

SYSTEM AND DEVICE FOR HIGH THROUGHPUT GENERATION OF COMBINATORIAL DROPLETS AND METHODS OF USE

CROSS-REFERENCE TO RELATED APPLICATIONS

This application is a U.S. national stage of PCT/US2015/012927, filed Jan. 26, 2015, which claims priority to U.S. provisional patent application 61/931,516, filed on Jan. 24, 2014, the entire contents of both of which are hereby incorporated by reference.

FEDERAL FUNDING BY THE U.S. GOVERNMENT

This invention was made with Government support of Grant No. R01CA155305 awarded by the Department of Health and Human Services, The National Institutes of Health (NIH). The U.S. Government has certain rights in this invention.

BACKGROUND

Technical Field

The field of the currently claimed embodiments of this invention relates to microfluidic systems, devices and methods, and more particularly to microfluidic systems, devices and methods providing high throughput generation of combinatorial droplets.

Discussion of Related Art

Recent research in digital microfluidics has burgeoned as droplets can function as miniaturized reactors in biological and chemical applications. Droplet microfluidic platforms boast the ability to generate many reactions within short time periods. However, most droplet platforms digitize samples into discrete droplets and are limited to the analysis of single samples under homogeneous probe conditions1. Such platforms are incapable of addressing the needs of next generation applications which require large libraries of samples and probes. Examples include single nucleotide polymorphism SNP analysis for crop improvement and genotyping required for identification of genes associated with common diseases. Therefore, there remains a need for improved microfluidic systems, devices and methods.

SUMMARY

Some embodiments of the current invention include a microfluidic system comprising: a microfluidic chip comprising a chip body defining: a droplet formation section comprising a sample input channel, a droplet splitting section fluidly connected to said droplet formation section, and a reagent injection section fluidly connected said droplet splitting section; a first sample source selectively connected to said sample input channel; a second sample source selectively connected to said sample input channel; and a rinsing fluid source selectively connected to said sample input channel.

Additional embodiments of the current invention include a microfluidic chip comprising a chip body defining: a droplet formation section comprising: a main channel, a sample input channel having a first end fluidly connected to said main channel and a second end configured to receive sample and rinsing fluid, an input-channel valve in said input channel to selectively allow and block fluid flow from said sample input channel to said main channel, a rinsing channel fluidly connected to said sample input channel at a position between said input-channel valve and said second end of said sample input channel, and a rinsing-channel valve in said rinsing channel to selectively allow and block fluid flow from said input channel to said rinsing channel, wherein said droplet formation section has a first configuration in which said input-channel valve is open and said rinsing-channel valve is closed to provide a sample droplet having a substantially predetermined volume in said main channel suspended in an inert fluid, and wherein said droplet formation section has a second configuration in which said input-channel valve is closed and said rinsing-channel valve is open such that rinsing fluid rinses said sample input channel by a flow of said rinsing fluid through said sample input channel and out said rinsing channel; a droplet splitting section fluidly connected to said main channel of said droplet formation section to receive said sample droplet from said main channel and split said sample droplet into a plurality of daughter droplets to be output from said droplet splitting section in a respective one of a plurality of secondary channels; and a reagent injection section fluidly connected to each of said plurality of secondary channels and having a corresponding plurality of reagent injection channels arranged such that each reagent of a plurality of reagents is injectable substantially simultaneously into a respective one of said plurality of daughter droplets while said daughter droplets are in said reagent injection section to provide a plurality of sample-reagent droplets output in a corresponding one of a plurality of output channels from said reagent injection section.

Some additional embodiments of the current invention include a method of performing a chemical assay, comprising: providing a first droplet in a main channel of a fluidic device from a first sample through an input channel of said fluidic device; rinsing said input channel of said fluidic device to remove substantially all remnants of said first sample from said input channel; immediately subsequent to said rinsing, providing a second droplet in said main channel of said fluidic device from a second sample through said input channel of said fluidic device such that said first droplet and said second droplet are separated by an inert fluid; dividing said first droplet into a first plurality of subdroplets; dividing said second droplet into a second plurality of subdroplets; adding a first plurality of reagents to a corresponding one of said first plurality of subdroplets; adding a second plurality of reagents to a corresponding one of said second plurality of subdroplets; detecting a physical property of each of said first and second pluralities of subdroplets to provide assay data; and determining a property of said first and second samples based on said assay data.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

Some embodiments of the current invention provide a parallelized droplet-based platform for on-demand, combinatorial generation of nano-liter droplets.

By parallelizing fission and fusion modules, throughput can be increased by two orders of magnitude. With 32 Hz droplet generation according to an embodiment of the current invention, the projected throughput of this parallelized design is nearly 3 million sample-probe droplets per day on a single device (with 4 replicates of 750 thousand different mixtures). This translates to 240 unique sample-probe mixtures with 4 replicates per minute.

Figure 1:
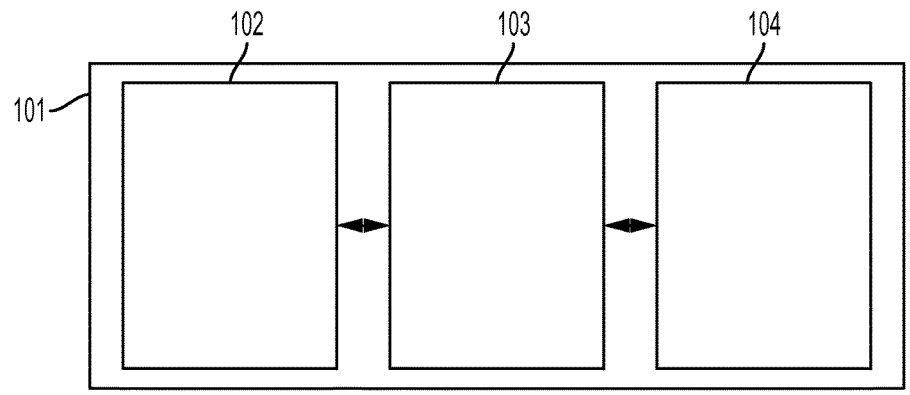
FIG. 1 is a schematic of an embodiment of the invention.

As seen in FIG. 1, an embodiment of the current invention can include a microfluidic chip 101, with a droplet formation section 102, a droplet splitting section 103 connected to the droplet formation section and a reagent injection section 104 fluidly connected the droplet splitting section.

Figure 2:
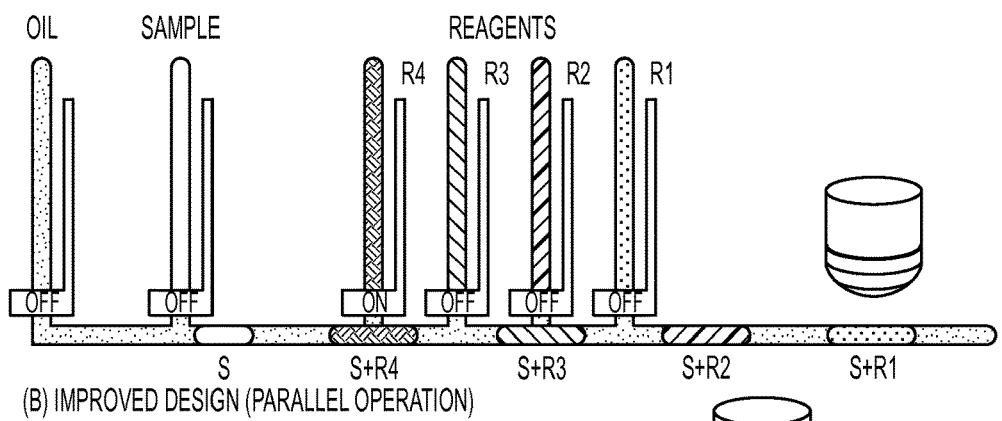
FIG. 2 is a schematic of an embodiment of the invention as compared to fluidic devices using serial operation.
Figure 2:
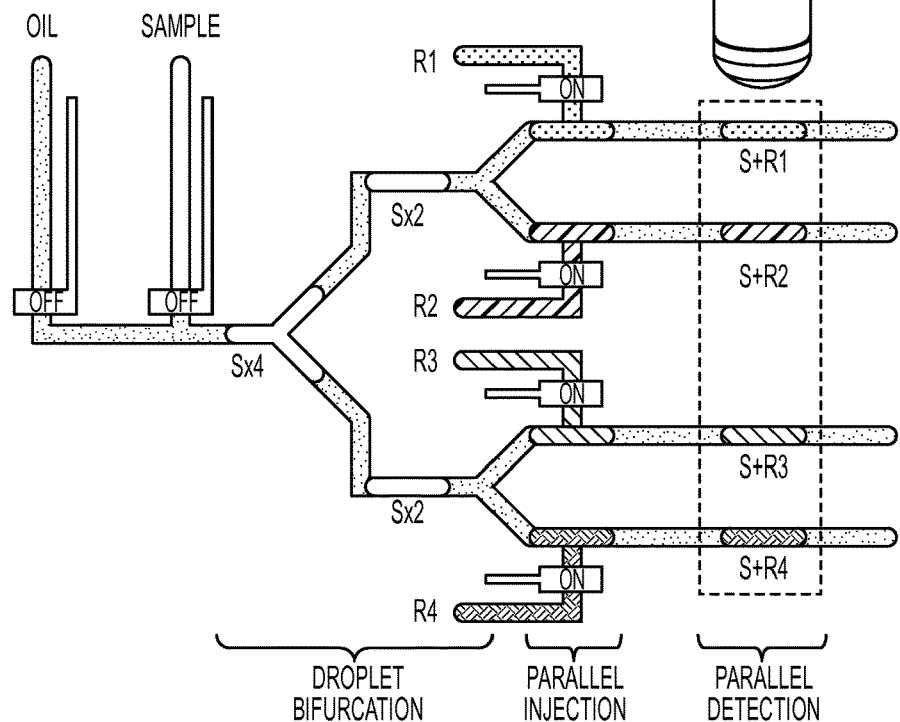

Embodiments of the current invention can be microfluidic chips that allow for parallel processing of sample droplets as seen in FIG. 2. FIG. 2 contrasts traditional linear design microfluidic chips (top panel) with an embodiment of the current invention which allows for parallel operation, processing and detection of sample droplets (bottom panel). As seen in FIG. 2 bottom panel, sample droplets are subjected to bifurcation steps prior to injection with a reagent. In this embodiment, bifurcation results in the formation of at least 4 daughter sample droplets. Then, these daughter droplets are each injected with one of four reagents (R1, R2, R3, R4) to form a sample droplet plus reagent (S+R1, S+R2, S+R3, S+R4). Finally, these sample plus reagent droplets are detected in parallel. This is in contrast to traditional approaches (top panel) where sample droplets are incubated with reagents (R4, R3, R2 and R1) to create sample plus reagent droplets (S+R4, S+R3, S+R2 and S+R1) in a linear manner.

Figure 3:
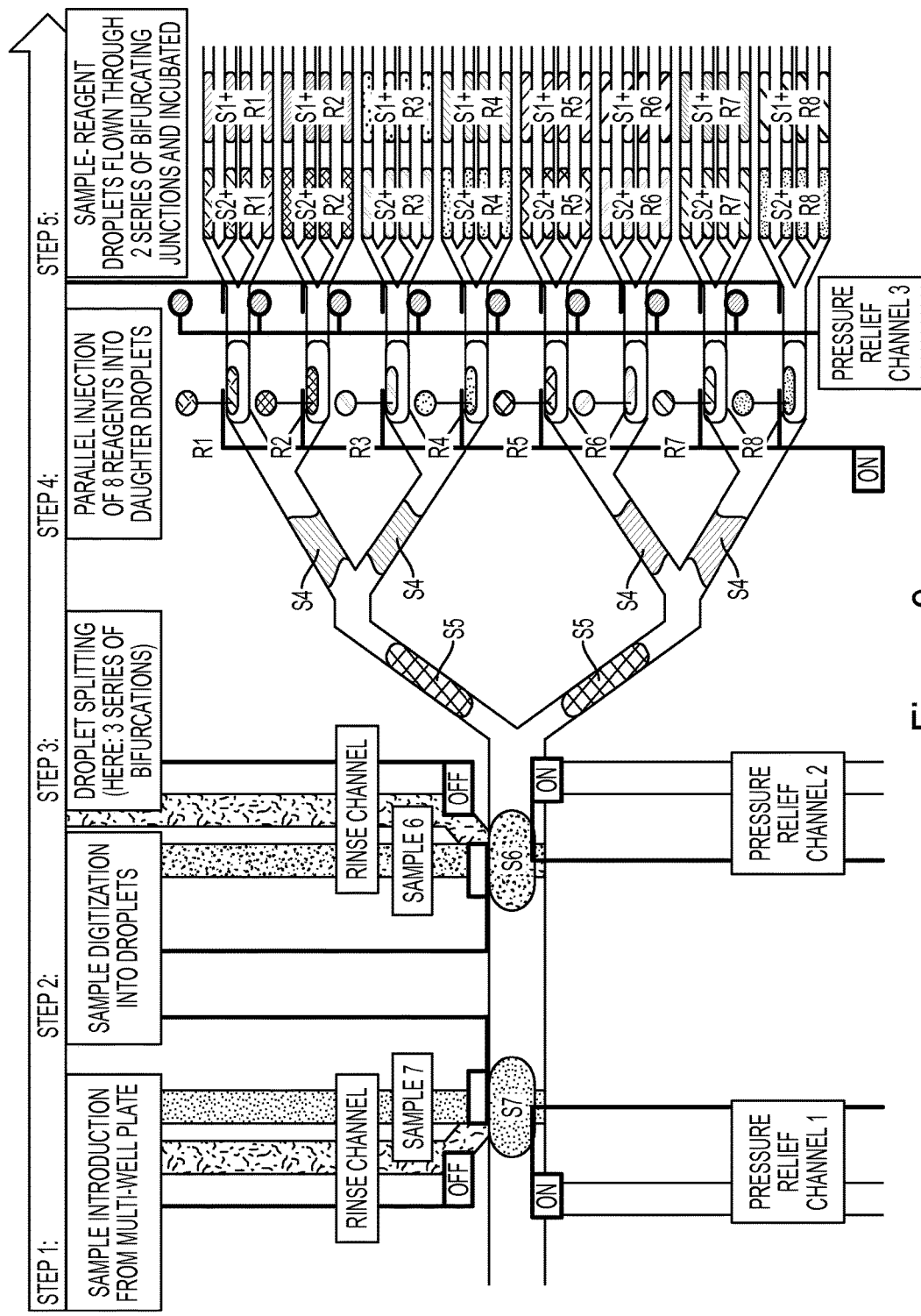
FIG. 3 is a schematic of a parallelized droplet fission and fusion platform.

FIG. 3 details the embodiment described in FIG. 2. In this embodiment, the invention works through a series of steps: Step 1: The droplet platform (or microfluidic chip) is capable of accepting an unlimited number of samples from a multi-well plate. An unlimited number of samples can subsequently be loaded and processed; in this case at least 7 samples are represented by S1, S2, S3, S4, S5, S6 and S7. It can be seen from FIG. 3 that samples 1-7 can be processed in a sequential order as their respective sample droplets (S1, S2, S3, S4, S5, S6 and S7) move through the channels. The droplet platform can be made capable of accepting an unlimited number of samples from a multi-well plate with a custom-build Serial Sample Loading (SSL) system. Step 2: Sample droplets are digitized into smaller daughter droplets of about ~30 nL in size. Once a sample has been processed, the sample inlet is rinsed prior to injection of new samples to prevent cross-contamination. Volume of sample droplets is controlled by valve opening time and back pressure on inlets. Pressure relief channels up- and down-stream (Pressure relief channel 1 and Pressure relief channel 2, respectively) contribute to droplet monodispersity by reducing downstream resistance. Step 3: Fission occurs as the daughter droplets flow through 3 serial bifurcating junctions and are split into 8 droplets. Flow is halted once the daughter droplets reach the reagent injection site by activating the oil valve. A third downstream pressure relief channel (Pressure relief channel 3) ensures homogeneous droplet splitting. Step 4: A library of reagents is then injected directly into the 8 sample daughter droplets simultaneously. In this case, probes (R1, R2, R3, R4, R5, R6, R7 and R8) are injected directly into the droplets. Probe volume is controlled by valve opening time and back pressure on inlets. Step 5: Post-injection, the 8 sample-reagent drops are mixed in serpentine channels and flow through 2 additional serial bifurcating junctions, producing a total of 32 droplets of 8 unique compositions. Detection can be performed using imaging or parallel confocal fluorescence spectroscopy systems[3].

This entire sequence of operations is carried out in less than a second. Furthermore, the sequence of droplets is maintained on the droplet platform. This permits spatial indexing for droplet identification. This precludes the need to include barcodes in each droplet to identify its contents.

The sample embodiments described above involve regions with two different channel heights. Positive, shallow channels (25 µm) are incorporated near the sample introduction region and probe inlets to allow for valve actuation. The rest of the fluidic layer is 45 µm high. We used SPR220-7 (Rohm & Haas, 25 µm) and SU-8 (Microchem, 3000 series, 45 µm) photoresist as the structural material for fabricating the mold for our device.

Fabrication of Example Microfluidic Chip or Platform

In addition, microfluidic chips illustrating the sample embodiment described above are fabricated using multilayer soft lithography techniques with a modified three-layer fabrication process. Soft lithography is used to make multiple devices from these molds. SYLGARD 184 Silicone Elastomer Kit is used for fabricating microfluidic chips illustrating an embodiment of the invention. The elastomer and curing agent from the kit is mixed in 10:1 (PDMS supportive material), 15:1 (fluidic), 7:1 (valve) ratio by weight and degassed for approximately 30 minutes before pouring on a respective molds. Once the individual PDMS layers have been assembled, the entire assembly is baked at 80° C. for 20 minutes. The solidified polymer is then peeled off and cut into individual chips. Fluidic access holes are then punched into individual chips and the chips are bonded with cover glass (No. 1) using O2 plasma. All the devices were treated with Aquapel to render their surface hydrophobic. The carrier fluid used to maintain the separation between sample plugs consisted of a perfluorocarbon (FC-3283) and a non-ionic fluorous-soluble surfactant (1H,1H,2H,2H-perfluoro-1-octanol) mixed in a ratio of 4:1 by volume.

Figure 4:
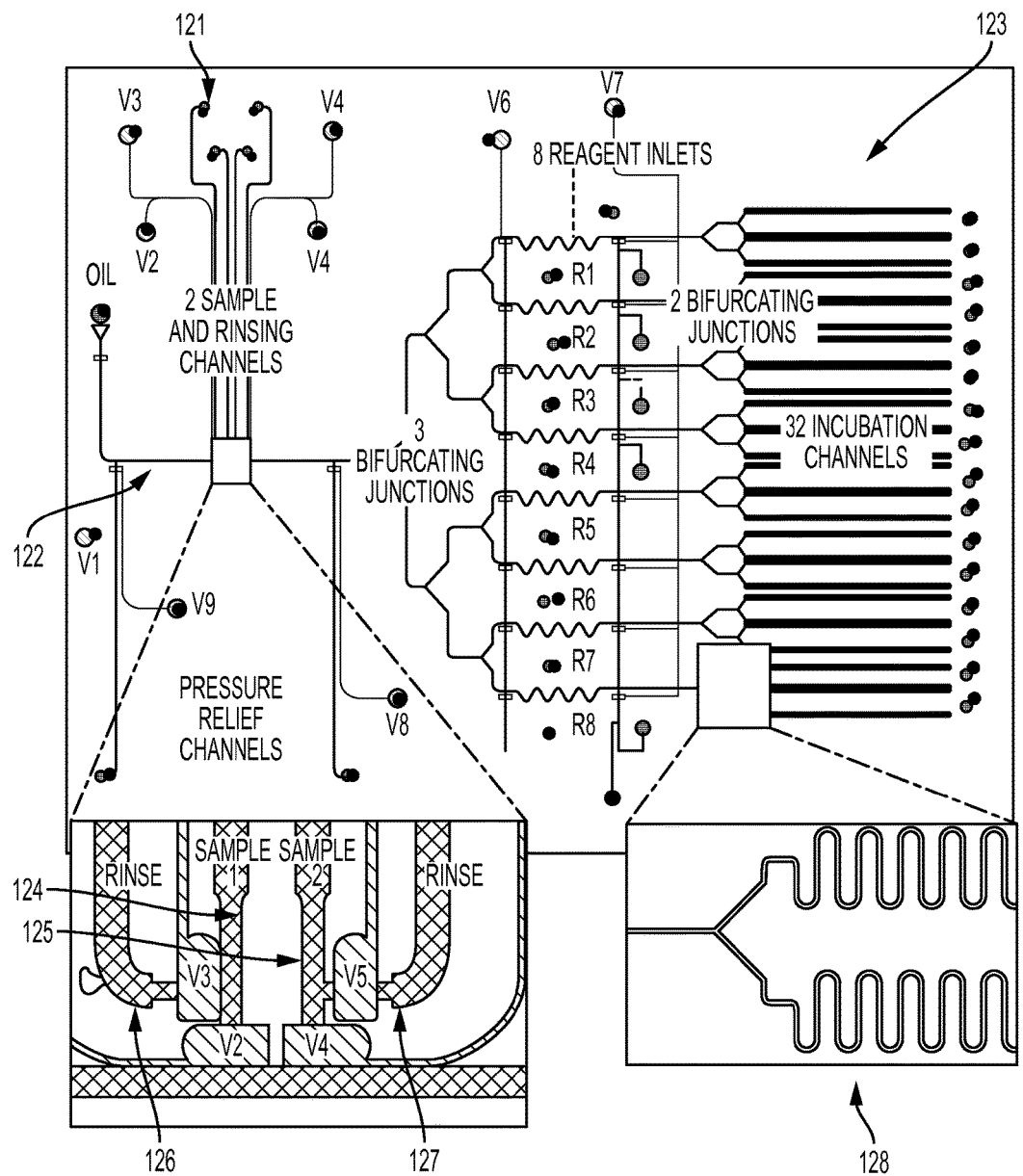
FIG. 4 shows the design and architecture of an example microfluidic device.
Figure 5:
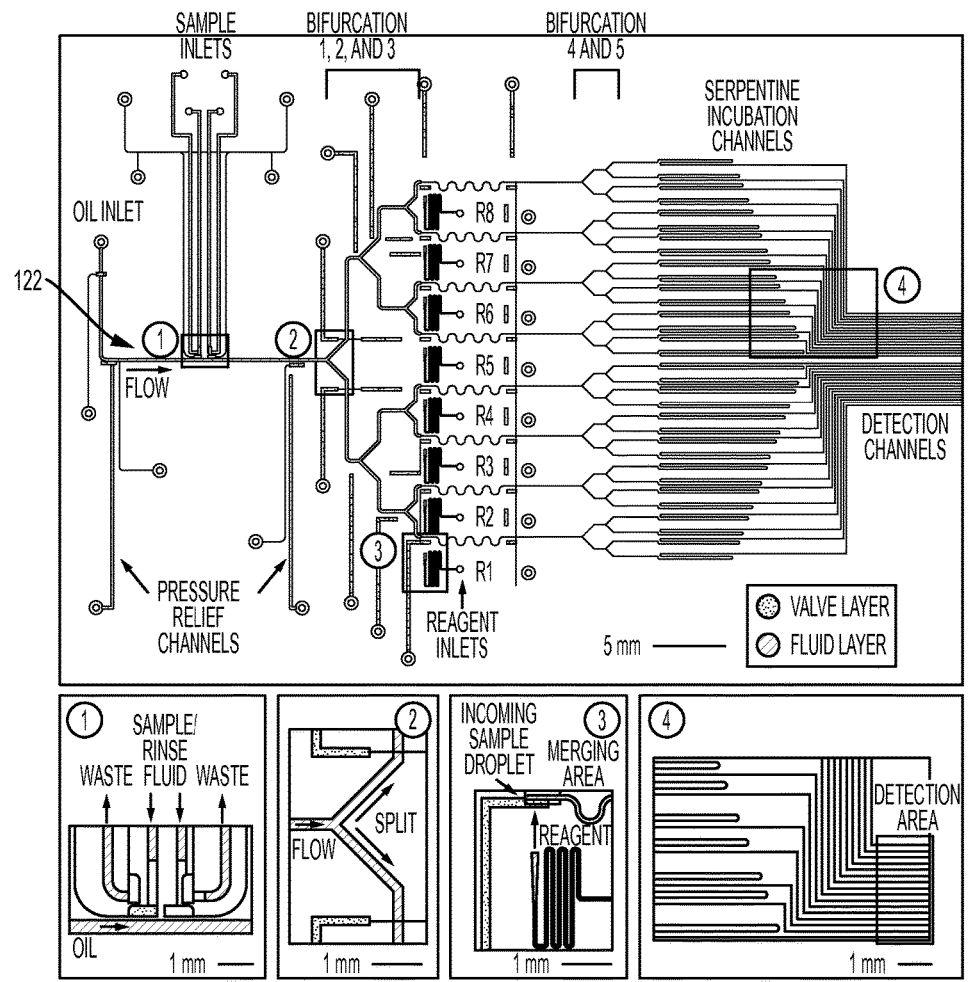
FIG. 5 shows the design and architecture of another example microfluidic device.

FIG. 4 and FIG. 5 illustrate embodiments of the invention illustrated in FIGS. 2 and 3 and described above. FIG. 4 shows a microfluidic chip capable of performing sample droplet generation, droplet splitting, droplet merging with probes and droplet detection on a single device.

FIG. 4 shows fluidic channels (121), valve layers (V1, V2, V3, V4, V5, V6, V7, V8) and oil inlet (Oil) connected to a central channel (or main channel) (122) with parallel fusion, fission and incubation regions (123). There are 2 sample inlets (or sample input channels) (124 and 125) with corresponding rinsing channels (126 and 127). Two pressure relief channels near the sample inlets ensure that the initial sample droplets are monodisperse by decoupling droplet size from flow resistance of the incubation channel. A third pressure relief channel after the fission regions decouples droplet splitting performance from flow resistance of the incubation channel. Incubation channels are serpentine in design 128.

FIG. 5 shows another embodiment of the microfluidic chip described above. The microfluidic device of FIG. 5 employs a two-layer architecture where the flow of oil, sample droplets, and reagent droplets in the fluid layer is regulated by designated valves in a valve layer. The oil is pumped via its inlet into the central channel to drive droplet formation and flow. The central channel (122)—where the droplet generation, bifurcation, fusion, and detection occur—undergoes several splits, connects with reagent inlet channels, and eventually divides into 32 channels with the same length and hence the same fluidic resistance. There are two sample inlets with corresponding rinsing channels (insert micrograph 1). Two pressure relief channels near the sample inlets ensure the uniformity of sample droplets by decoupling droplet generation from fluidic resistance of the incubation channel. Sample droplets travel through the first three stages of bifurcating Y-junctions (insert micrograph 2), producing a total of eight identical daughter droplets. Eight reagents can be injected via reagent inlets (reagent-injection channels) (R1-R8) and directly fused with incoming sample daughter droplets (insert micrograph 3). Fused sample-reagent droplets go through two additional bifurcating Y-junctions such that each injection of sample and reagents results in a total of 32 droplets (four replicates of eight different compositions). Each daughter droplet then flows through its serpentine incubation channel and arrives with all other daughter droplets in the same group simultaneously at the detection area, where all 32 channels become parallel and fit within a microscope viewing area, thus facilitating parallel detection via microscopy (insert micrograph 4).

Figure 6:
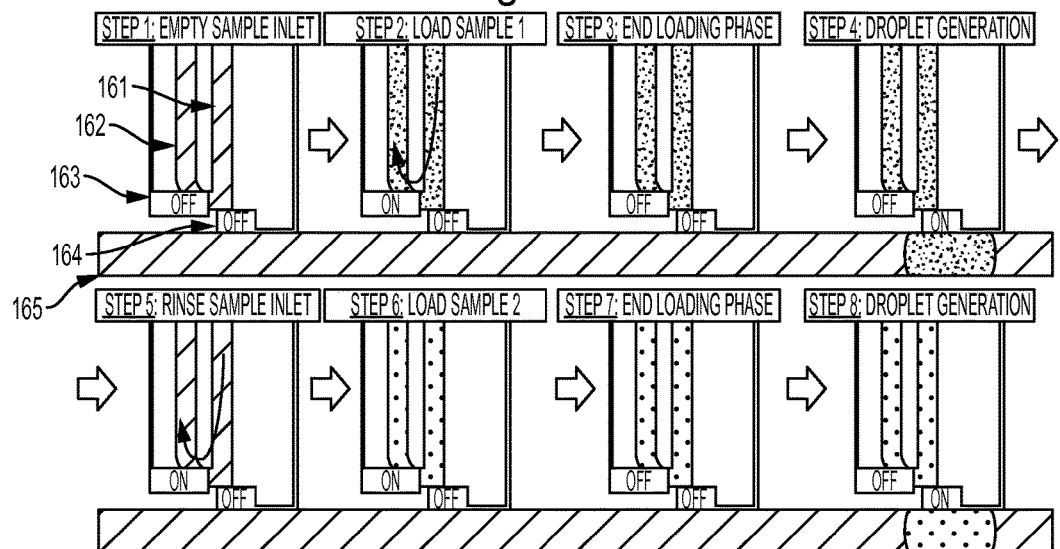
FIG. 6 is a schematic of sample droplet generation and channel rinsing.

In an embodiment of the invention, sample droplets are formed in a series of steps as illustrated in FIG. 6. In FIG. 6, Step 1: a sample input channel 161 and a rinse channel 162 remain empty while valve 1 (rinsing channel valve) (163) and valve 2 (input channel valve) (164) remain closed. In step 2: sample is loaded into the sample inlet while valve 1 remains in a closed configuration and valve 2 is in an open configuration. In Step 3: the sample loading phase is completed and both valves are closed. In Step 4: valve 1 is opened and a droplet is formed into the main channel 165. In Step 5, valve 1 is closed and valve 2 is opened to allow for a rinse fluid to rinse the sample input channel. Used rinse fluid exits through the rinse channel. The process of Steps 2-4 is repeated in Steps 6-8 with either the same sample or a different sample.

Microfluidic chips illustrated in FIG. 4 and FIG. 5 and described above were then used for sample droplet preparation and processing. All the inputs on the devices were kept under constant pressure, with independent input pressures for 1) carrier fluid input, 2) both sample inlets and 3) all 8 probe inputs. The pressure applied to the sample inlets was directly controlled by the pressure controller used for the SSL system. All the valves on the device were controlled by an array of off-chip solenoid valves, as has been demonstrated earlier. We developed Matlab (Mathworks, Natick Mass.) software for computer control of the valve array. This software allowed us to execute a predetermined sequence of valve actuation with independent time control for each actuation. The opening of a valve corresponding to an input on the device led to the release of a sample droplet of fluid from that inlet into a central channel on the device. The volume of this droplet could be controlled through variation of the opening time of the valve as well as the back pressure.

Regarding reagents: the volume of sample and probe droplets generated using the microfluidic device were estimated. This volume estimation was performed by processing the images of these droplets using the software ImageJ. For sample droplet volume estimation, we generated droplets made of blue food dye using one of the four reagent inlets on the microfluidic devices, until the whole incubation region on the devices were full of droplets. The whole device was then imaged using a DSLR camera. The image was imported in ImageJ and cropped to obtain an image of the incubation region on the device. This image was then converted to a binary image using color thresholding to identify droplets over the background image. An estimate of the droplet area for each droplet in the image was then obtained using the 'Analyze Particles' function. This analysis was limited to particle areas larger than a lower threshold to exclude any particles and occasional satellite droplets from the analysis. The droplet areas thus estimated were then converted to droplet volume using the known depth of the incubation channel region (200 µm).

Figure 7:
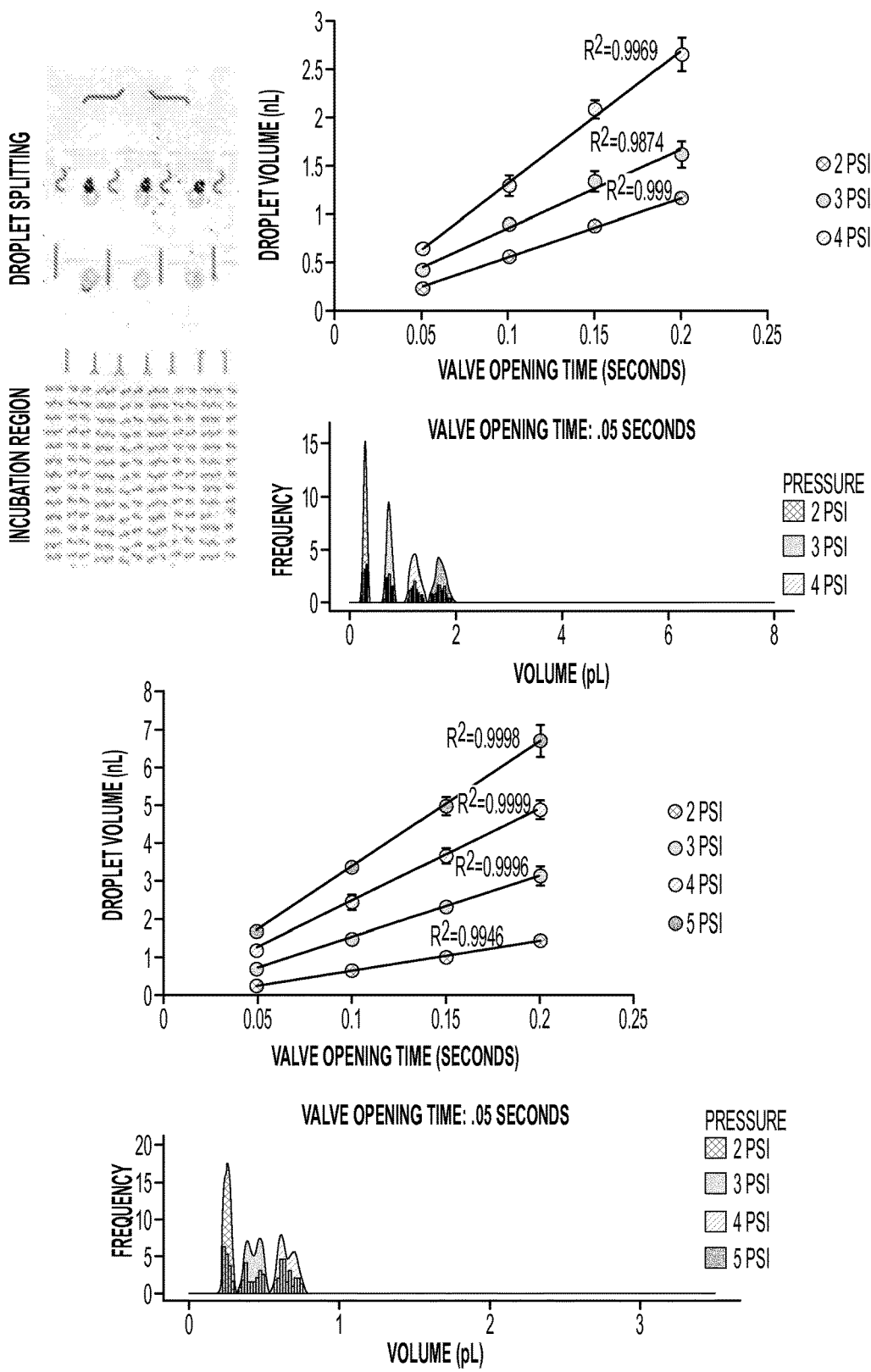
FIG. 7 shows a micrograph of a section of fission and incubation regions of an example device and plots of sample droplet volume dependence on valve opening time and back pressure.

The devices exhibits excellent sample droplet uniformity for identical droplet generation and fission conditions. The fine control of droplet size generated on the device from an individual sample inlet through variation of pressure and valve opening time is demonstrated in FIG. 7. For these measurements, final droplet size after fission was measured. A unique feature of the device is 3 pressure relief channels. The pressure relief channels decouple both 1) the dependence of initial droplet size generated as well as 2) fission of droplets on the device from the flow resistance of the incubation channel. In FIG. 7, the left panel shows a micrograph of a section of fission and incubation regions of the device and shows sample droplets containing green food dye being split and incubated. The top middle graph of FIG. 7 is a plot of sample droplet volume dependence on valve opening time and back pressure. Droplet volume was measured after droplet fission. Droplet volume varies linearly with the valve opening time. Small error bars indicate monodispersity. The bottom middle panel is a histogram of sample droplet volumes (valve opening time 0.05 seconds). Histograms are overlayed with Kernel density plots. Three datasets are visible: droplet volumes for 2 PSI, 3 PSI and 4 PSI. All populations of droplets have a narrow distribution indicating monodispersity and are well-separated (no overlap in droplet volumes). The top right graph is a plot of probe droplet volume dependence on valve opening time and back pressure. Droplet volume was measured after droplet fission. Droplet volume varies linearly with the valve opening time. Small error bars indicate monodispersity. The bottom right graph is an example of histogram of probe droplet volumes (valve opening time 0.05 seconds). Histograms are overlayed with Kernel density plots. Four datasets are visible: droplet volumes for 2 PSI, 3 PSI, 4 PSI and 5 PSI. All populations of droplets have a narrow distribution indicating monodispersity and are well-separated (no overlap in droplet volumes).

Figure 8:
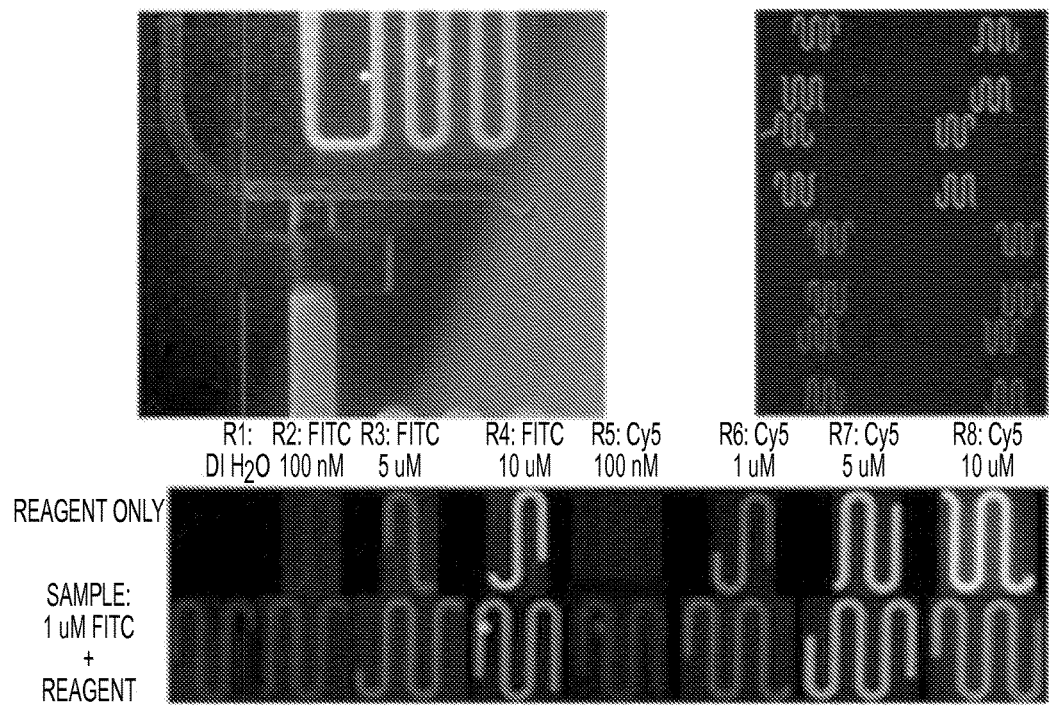
FIG. 8 shows fluorescent micrographs of a microfluidic device indicating the multiplexing capability of the device.

Generation of 8 combinatorial mixtures of sample plugs and probes on the device is shown in FIG. 8. In FIG. 8, different fluorophores with varying concentrations were used (FITC, Cy5, DI $H_2O$) to simulate different samples and probes. In FIG. 4, the top left panel shows reagent injection: Fluorescent micrograph of sample droplet (green: FITC—1 µM) at reagent (Cy5—5 µM) injection inlet. The top right panel displays merged sample-reagent droplets in incubation region. Top 4 rows of droplets were injected with Reagent 8 (Cy5—10 µM). Bottom 4 rows were injected with Reagent 7 (Cy5—5 µM). The bottom panel shows fluorescent micrographs of combinatorial droplets: the upper row displays droplets containing only reagents (R1-R8) and the bottom panel displays merged sample (1 µM FITC) and reagent (R1-R8) droplets.

Figure 9:
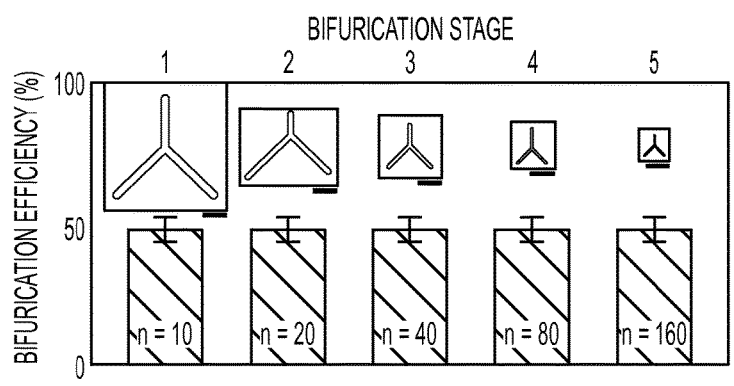
FIG. 9 shows the uniformity of droplet bifurcation.

The uniformity of droplet bifurcation can be seen in FIG. 9. Droplets are able to split into equal halves—as indicated by the ~50% bifurcation efficiency across all five bifurcation stages. Insert micrographs show droplets, which are colored with black food dye for enhanced visualization, about to split into equal halves at the five bifurcation stages. The scale bar below each micrograph represents 500 µm.

Figure 10:
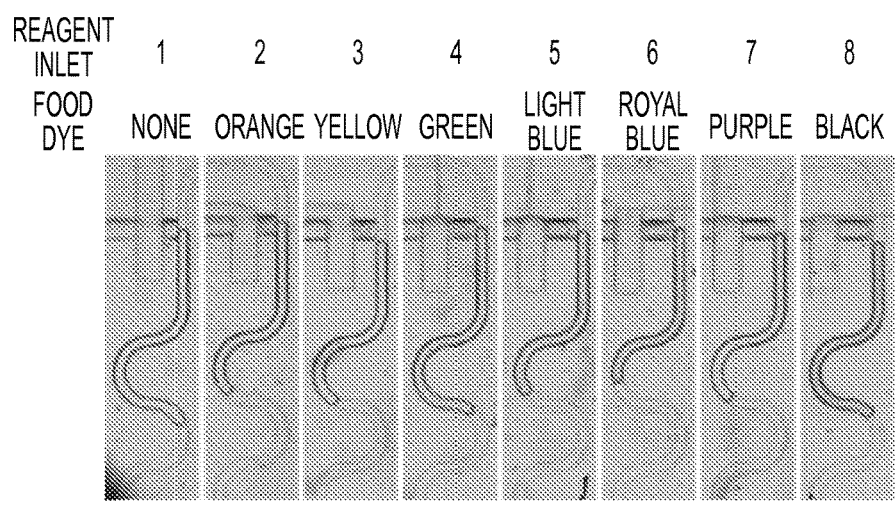
FIG. 10 shows uniform reagent droplets.

Parallel, Eight-flex Injection of Uniform Reagent Droplets can be seen in FIG. 10. Simultaneous actuation of the eight reagent inlets result in reagent droplets with uniform sizes across all inlets.

Figure 11:
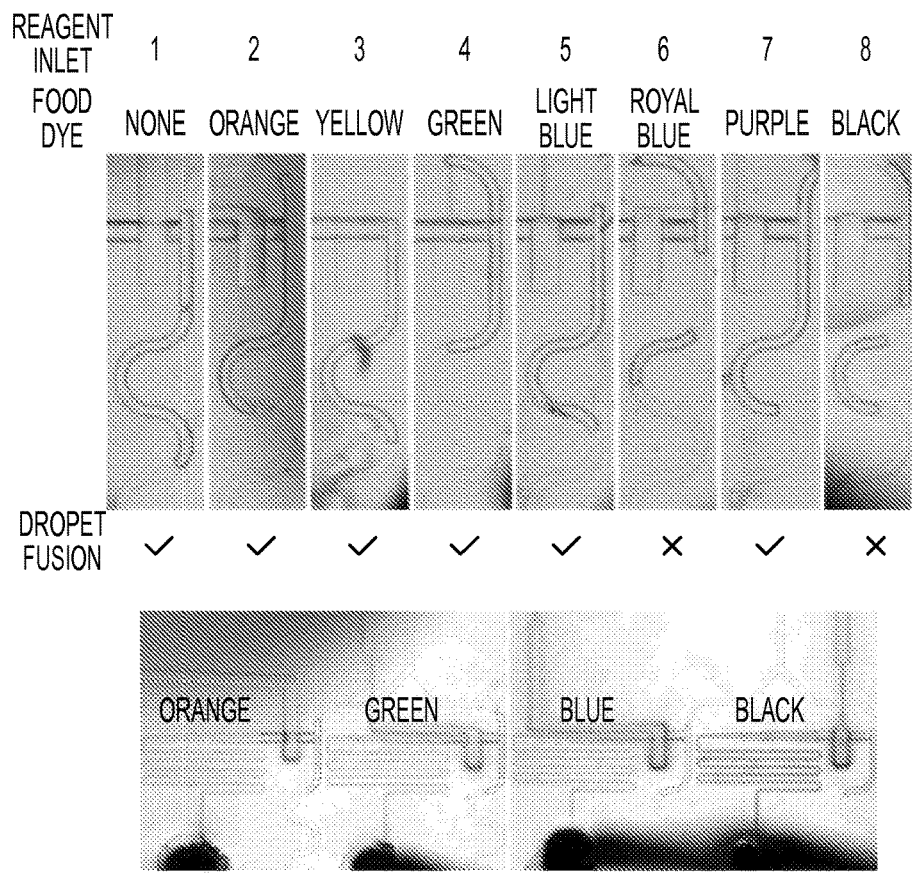
FIG. 11 shows fused sample-reagent droplets.

Parallel, Eight-flex Fusion of Sample Droplets with Reagent Droplets can be seen in FIG. 11. In FIG. 8, simultaneous injection of the eight reagents directly into eight incoming sample daughter droplets results in eight fused sample-reagent droplets.

Figure 12:
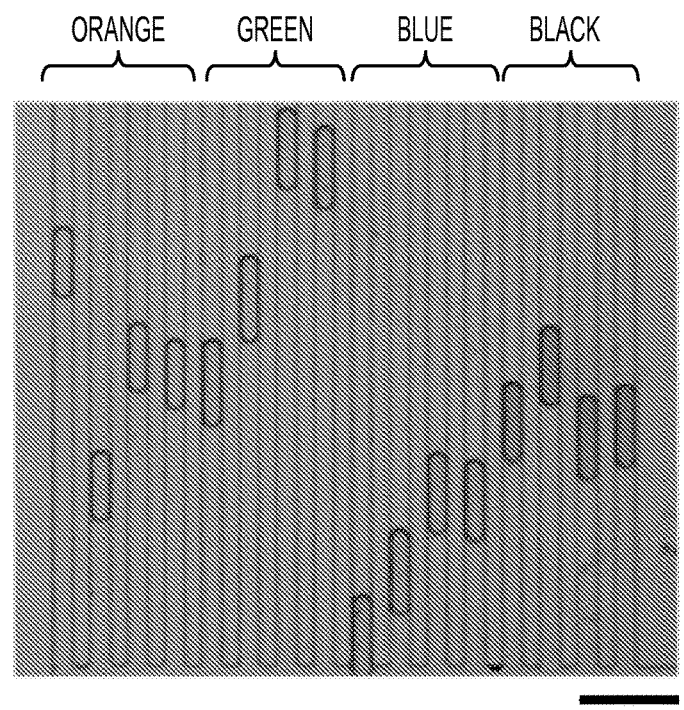
FIG. 12 shows imaging-based parallel detection of fused droplets.
Figure 12:
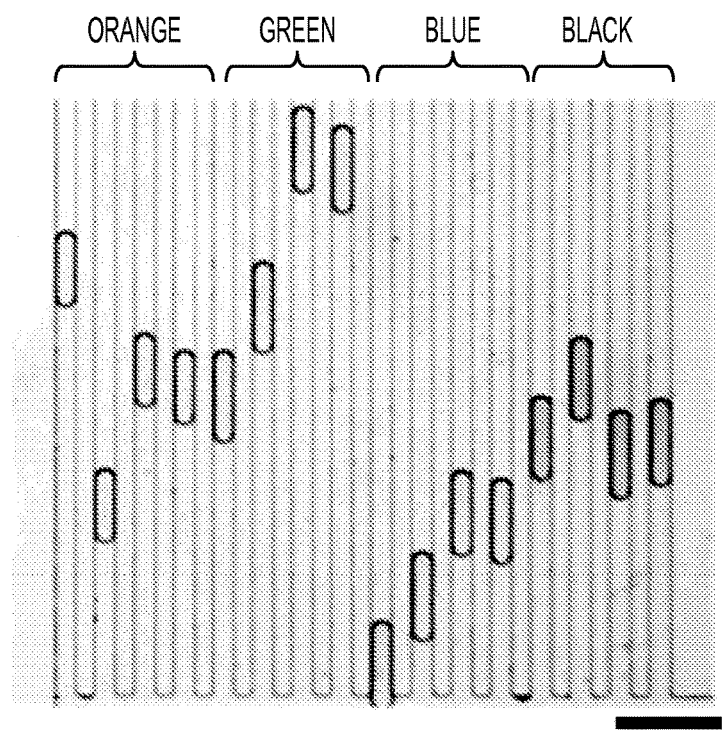

Imaging-Based Parallel Detection of Fused Droplets is shown in FIG. 12. Each of the eight fused sample-reagent droplets undergoes two additional bifurcations, which results in four replicates of fused daughter droplets. After incubation, these droplets are detected in parallel in the detection zone. The scale bar represents 500 µm.

In other embodiments of the platform described above, each of the reagent inlet channels are outfitted with individual rinse channels and valves (as described for the sample inlet channels above and in FIGS. 3-6) so that the reagent inlet channels can be rinsed prior to subsequent uses.

In other embodiments of the platform described above, multiple sample input channels are incorporated such that multiple samples are processed simultaneously. In such embodiments, the sample inlet channels work in an alternating manner such that while a first sample input channel is providing a sample droplet, an alternative sample input channel is rinsed and subsequently loaded with either an additional aliquot of the sample or an aliquot of a different sample. Once the first sample input channel has provided a sample droplet, it is rinsed while the second sample input channel provides a sample droplet. The process is repeated.

In other embodiments of the platform described above, additional sections for creating chaotic mixes are also included so as to mix sample and/or sample-reagent droplets.

Example Devices

Other embodiments of the current invention can provide a parallel microfluidic emulsification device, which increases throughput while maintaining the ability to generate combinatorial mixtures. In such an embodiment, a microfluidic chip as described above in previous embodiments is connected to additional systems. In such an embodiment, the device works through a series of steps (as illustrated in FIG. 3): Step 1: The droplet platform can be made capable of accepting an unlimited number of samples from a multi-well plate with a custom-build Serial Sample Loading (SSL) system (also described in FIG. 14 and FIG. 15, top panel). Step 2: Sample droplets are digitized into smaller daughter droplets (~30 nL). Once a sample has been processed, the sample inlet is rinsed with buffer solution prior to injection of new samples to prevent cross-contamination. Step 3: Fission occurs as the daughter droplets flow through 3 serial bifurcating junctions and are split into 8 droplets. Flow is halted once the daughter droplets reach the probe injection site by activating the oil valve. Step 4: A library of probes is then injected directly into the 8 sample daughter droplets simultaneously. Step 5: Post-injection, the 8 sample-probe drops are mixed in serpentine channels and flow through 2 additional serial bifurcating junctions, producing a total of 32 droplets of 8 unique compositions. This entire sequence of operations is carried out in less than a second. Furthermore, the sequence of droplets is maintained on the device. This permits spatial indexing for droplet identification. This precludes the need to include barcodes2 in each droplet to identify its contents.

Figure 13:
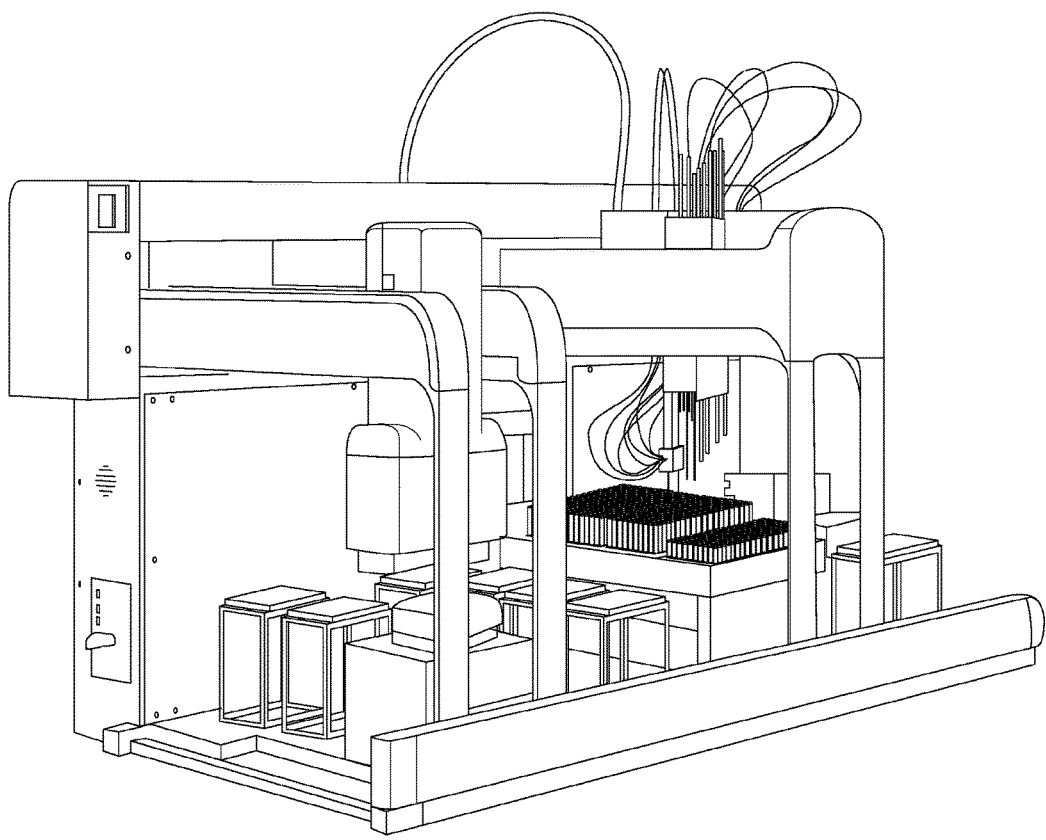
FIG. 13 shows a device for automated loading coupled to a microfluidic device.
Figure 14:
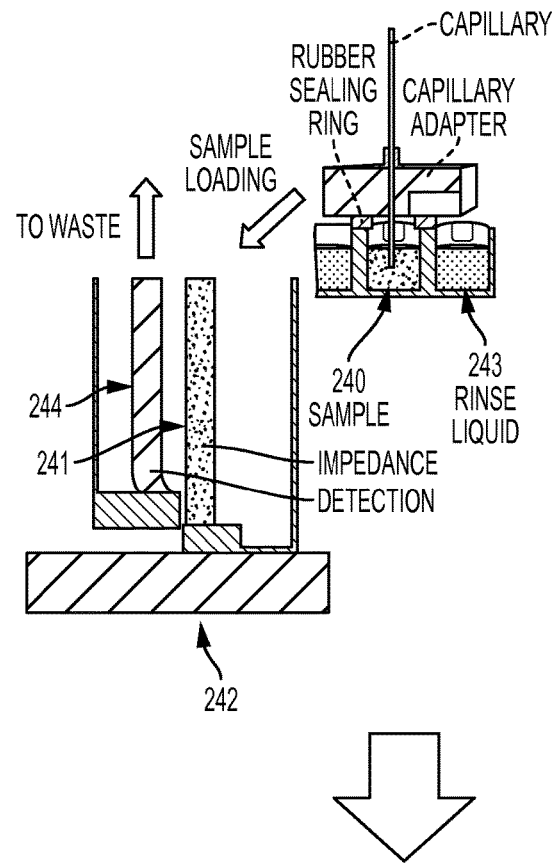
FIG. 14 shows a device for impedance detection coupled to a microfluidic device.
Figure 14:
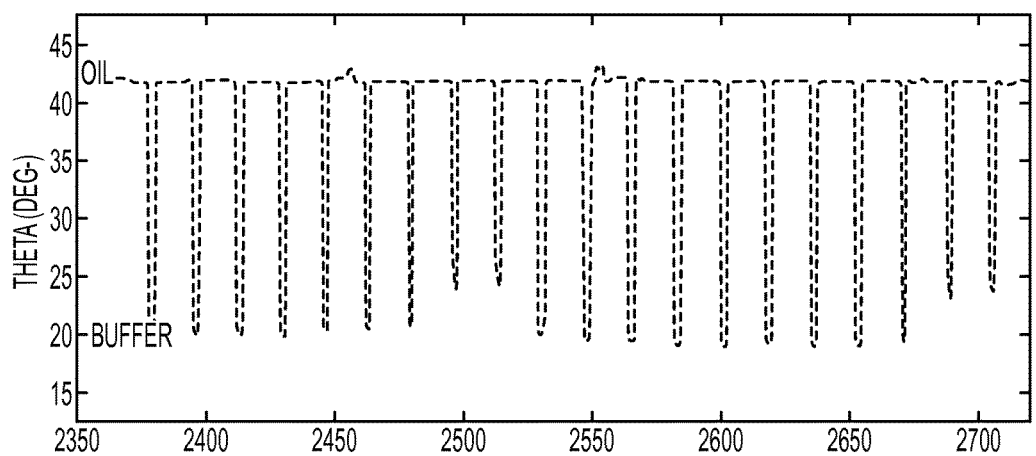

In another embodiment of the device described above, an automated sample loading system (such as an autosampler or robotic pipetter) is connected to the sample input channels as is seen in FIG. 13. This can allow for an unlimited number of samples to be processed as well as automation of the device. After each sample, channels are rinsed using rinsing channels built into the device to prevent cross-contamination (FIG. 14, top panel). In FIG. 14 (top panel), sample is loaded from a sample reservoir (240) to an input channel (241). Once a sample droplet is generated in a main channel (242), the input channel is rinsed with rinse liquid from a rinse liquid reservoir (243) and the rinse fluid exits the input channel from a waste channel (244). The autosampler or robotic pipetter can also fitted with a capillary, a capillary adapter and a rubber sealing ring to facilitate sample loading and input channel rinsing.

In another embodiment of the device described above, pressure relief channels are coupled to the invention. These pressure relief channels are opened when droplets are being generated, which in turn leads to monodisperse droplets. Size analysis based on the area of the droplets indicates that droplets exhibit excellent monodispersity.

In another embodiment of the device described above, a novel combination of droplet splitting and post-splitting reagent injection is coupled to the invention. This can allow the droplet generation process to be highly parallelized. In the embodiment of the device of the examples described below, a single sample plug is split into 8 daughter droplets. 8 different reagents are injected in parallel directly into the droplets. Additional splitting after reagent injection creates four replicate droplets from reach unique combination, 32 droplets total. It is important to note that the particular device describe here is one embodiment of a concept that can be varied to fit a wide range of needs by changing the number or arrangement of channels, ports, valves, number of stages of splitting, etc.

In another embodiment of the device described above, sample-probe droplets are maintained in a single file configuration, thus precluding the need for a barcoding mechanism to identify the contents of each individual droplet.

In another embodiment of the device described above as seen in FIG. 14, an impedance detection system is connected to the sample input channels. In such an embodiment, the impedance detection system functions by optically monitoring the contents of the sample input channels and the rinsing channels for automated detection of sample or rinsing fluid. If the channels contain sample, the impedance system feedbacks to a controller to direct the release of the sample fluid into the main channel for generation of a sample droplet. Alternatively, if rinse fluid is contained in the channels, the impedance system feedbacks to the controller to direct the release of the rinse fluid through the rinse channel. The impedance system provides readout of the contents of the channels while the device is in use as can be seen in FIG. 14, bottom panel. Such an impedance system can also be added to the reagent injection channels to determine the contents of these channels and direct either their rinsing or reagent injection.

The examples described above of on-demand, parallelized nano-liter droplet-based platforms and devices that accept an unlimited number of sample plugs from a multi-well plate, digitizes these plugs into smaller daughter droplets, performs droplet splitting and robust synchronization-free fusion with a library of probes in parallel are sample embodiments of the current invention. In the examples described above, the sequence of sample-probe droplets on the device is maintained, permitting spatial indexing to identify droplet contents. The devices described above combine the precision of valve-based devices while featuring increased throughput. The on-demand platform described above meets the demand for flexible and cost-effective tools that can perform high throughput screening for next generation applications.

In view of the example embodiments described above, the following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

REFERENCES

1. Huebner A, Srisa-Art M, Holt D, et al. Chem Commun (Camb). 2007; (12)(12):1218-1220.
2. Brouzes E, Medkova M, Savenelli N, et al. Proc Natl Acad Sci USA. 2009; 106(34):14195-14200.
3. Puleo C M, Yeh H C, Liu K J, Wang T H. Lab Chip. 2008; 8(5):822-825.

We claim:

1. A microfluidic system comprising:
a microfluidic chip comprising a chip body defining:
 a droplet formation section comprising:
  a main channel,
  a sample input channel having a first end fluidly connected to said main channel and a second end configured to receive sample and rinsing fluid,
  an input-channel valve in said sample input channel to selectively allow and block fluid flow from said sample input channel to said main channel,
  a rinsing channel fluidly connected to said sample input channel at a position between said input-channel valve and said second end of said sample input channel, and
  a rinsing-channel valve in said rinsing channel to selectively allow and block fluid flow from said sample input channel to said rinsing channel,
  wherein said droplet formation section has a first configuration in which said input-channel valve is open and said rinsing-channel valve is closed to provide a sample droplet having a substantially predetermined volume in said main channel suspended in an inert fluid, and wherein said droplet formation section has a second configuration in which said input-channel valve is closed and said rinsing-channel valve is open such that rinsing fluid rinses said sample input channel by a flow of said rinsing fluid through said sample input channel and out said rinsing channel;
 a droplet splitting section fluidly connected to said main channel of said droplet formation section to receive said sample droplet from said main channel and split said sample droplet into a plurality of daughter droplets to be output from said droplet splitting section in a respective one of a plurality of secondary channels; and
 a reagent injection section fluidly connected to each of said plurality of secondary channels and having a corresponding plurality of reagent injection channels arranged such that each reagent of a plurality of reagents is injectable substantially simultaneously into a respective one of said plurality of daughter droplets while said daughter droplets are in said plurality of secondary channels to provide a plurality of sample-reagent droplets output in a corresponding one of a plurality of output channels;
a first sample source selectively connected to said sample input channel;
a second sample source selectively connected to said sample input channel; and
a rinsing fluid source selectively connected to said sample input channel,
wherein the plurality of output channels are fluidly connected to the plurality of secondary channels and are configured to receive the plurality of sample-reagent droplets, and
wherein said droplet splitting section is a multistage droplet splitter.

2. A microfluidic system as in claim 1, wherein an automated sample loading system is fluidly connected to said microfluidic chip.

3. A microfluidic system as in claim 1, wherein an impedance detection system is fluidly connected to said microfluidic chip.

4. A microfluidic system as in claim 1, wherein a sample detection system is fluidly connected to said microfluidic chip.

5. A microfluidic chip comprising a chip body defining:
a droplet formation section comprising:
a main channel,
a sample input channel having a first end fluidly connected to said main channel and a second end configured to receive sample and rinsing fluid,
an input-channel valve in said sample input channel to selectively allow and block fluid flow from said sample input channel to said main channel, a rinsing channel fluidly connected to said sample input channel at a position between said input-channel valve and said second end of said sample input channel, and a rinsing-channel valve in said rinsing channel to selectively allow and block fluid flow from said sample input channel to said rinsing channel, wherein said droplet formation section has a first configuration in which said input-channel valve is open and said rinsing-channel valve is closed to provide a sample droplet having a substantially predetermined volume in said main channel suspended in an inert fluid, and wherein said droplet formation section has a second configuration in which said input-channel valve is closed and said rinsing-channel valve is open such that rinsing fluid rinses said sample input channel by a flow of said rinsing fluid through said sample input channel and out said rinsing channel;

a droplet splitting section fluidly connected to said main channel of said droplet formation section to receive said sample droplet from said main channel and split said sample droplet into a plurality of daughter droplets to be output from said droplet splitting section in a respective one of a plurality of secondary channels; and a reagent injection section fluidly connected to each of said plurality of secondary channels and having a corresponding plurality of reagent injection channels arranged such that each reagent of a plurality of reagents is injectable substantially simultaneously into a respective one of said plurality of daughter droplets while said daughter droplets are in said plurality of secondary channels to provide a plurality of sample-reagent droplets output in a corresponding one of a plurality of output channels;

wherein the plurality of output channels are fluidly connected to the plurality of secondary channels and are configured to receive the plurality of sample-reagent droplets, and wherein said droplet splitting section is a multistage droplet splitter.

6. A microfluidic chip according to claim 5, wherein said droplet formation section comprises a pressure relief channel to controllably regulate pressure on said sample droplet while being formed.

7. A microfluidic chip according to claim 5, wherein said reagent injection section comprises a pressure relief channel to controllably regulate pressure on said plurality of daughter droplets while each of said plurality of reagents is being injected into a corresponding one of said plurality of daughter droplets.

8. A microfluidic chip according to claim 5, further comprising a sample-reagent droplet splitting section fluidly connected to each of said plurality of output channels to receive said plurality of sample-reagent droplets and split each of said sample-reagent droplets into a plurality of daughter sample-reagent droplets to be output from said sample-reagent droplet splitting section in a respective one of a plurality of second output channels.

9. A microfluidic chip according to claim 8, wherein said sample-reagent droplet splitting section is a multistage droplet splitter.

10. A microfluidic chip according to claim 8, further comprising an incubation section fluidly connected to each of said plurality of second output channels such that each of said sample-reagent droplets flows into a respective one incubation channel so as to maintain identifiable sample and reagent information thereof.

11. A microfluidic chip according to claim 10, wherein said incubation channels are of an equal length.

12. A microfluidic chip according to claim 5, further comprising a section with detection channels wherein said detection channels are at least partially transparent for optical measurements.

13. A microfluidic chip according to claim 5, wherein said reagent injection section further comprises:
   a reagent injection valve in each of said plurality of reagent injection channels to selectively allow and block fluid flow from each of said plurality of reagent injection channels to said plurality of secondary channels,
   a rinsing channel fluidly connected to each of said plurality of reagent injection channels, and
   a rinsing-channel valve in said rinsing channel to selectively allow and block fluid flow from each of said plurality of reagent injection channels to said rinsing channel,
   wherein said regent injection section has a first configuration in which said reagent injection valve in each of said plurality of reagent injection channels is open and said rinsing-channel valve in said rinsing channel is closed to provide a reagent in said plurality of secondary channels, and wherein said reagent injection section has a second configuration in which said reagent injection valve in each of said plurality of reagent injection channels is closed and said rinsing-channel valve in said rinsing channel is open such that rinsing fluid rinses each of said plurality of reagent injection channels by a flow of said rinsing fluid through each of said plurality of reagent injections channels and out said rinsing channel fluidly connected to each of said plurality of reagent injection channels.

14. A microfluidic chip according to claim 5, wherein said droplet formation section further comprises:
   a second sample input channel having a first end fluidly connected to said main channel and a second end configured to receive sample and rinsing fluid,
   an input-channel valve in said second sample input channel to selectively allow and block fluid flow from said at second sample input channel to said main channel,
   a second rinsing channel fluidly connected to said second sample input channel at a position between said input-channel valve and said second end of said second sample input channel, and
   a rinsing-channel valve in said second rinsing channel to selectively allow and block fluid flow from said second sample input channel to said second rinsing channel,
   wherein said droplet formation section has a third configuration in which said input-channel valve of said second sample input channel is open and said rinsing-channel valve of said second rinsing channel is closed to provide a sample droplet having a substantially predetermined volume in said main channel suspended in an inert fluid, and wherein said droplet formation section has a fourth configuration in which said input-channel valve of said second sample input channel is closed and said rinsing-channel valve of said second rinsing channel is open such that rinsing fluid rinses said second sample input channel by a flow of said rinsing fluid through said second sample input channel and out said second rinsing channel.

15. A microfluidic chip according to claim 14, wherein said sample input channels function in an alternating manner such that while a first of said sample input channels is configured to provide a sample droplet into said main channel, a second of said sample input channels is simultaneously configured to rinse, and wherein following sample droplet formation by said first of said sample input channels, said first of said sample input channels is configured to rinse and said second of said sample input channels is simultaneously configured to provide a sample droplet into said main channel.

16. A microfluidic chip according to claim 14, wherein said droplet formation section comprises a pressure relief channel to controllably regulate pressure on said sample droplet while being formed.

17. A microfluidic chip according to claim 14, wherein said reagent injection section comprises a pressure relief channel to controllably regulate pressure on said plurality of daughter droplets while each of said plurality of reagents is being injected into a corresponding one of said plurality of daughter droplets.

18. A microfluidic chip according to claim 14, wherein said droplet splitting section is a multistage droplet splitter.

19. A microfluidic chip according to claim 14, further comprising a sample-reagent droplet splitting section fluidly connected to each of said plurality of output channels to receive said plurality of sample-reagent droplets and split each of said sample-reagent droplets into a plurality of daughter sample-reagent droplets to be output from said sample-reagent droplet splitting section in a respective one of a plurality of second output channels.

20. A microfluidic chip according to claim 19, wherein said sample-reagent droplet splitting section is a multistage droplet splitter.

21. A microfluidic chip according to claim 19, further comprising an incubation section fluidly connected to each of said plurality of second output channels such that each of said sample-reagent droplets flows into a respective one incubation channel so as to maintain identifiable sample and reagent information thereof.

22. A microfluidic chip according to claim 21, wherein said incubation channels are of an equal length.

23. A microfluidic chip according to claim 14, wherein said reagent injection section further comprises:
- a reagent injection valve in each of said plurality of reagent injection channels to selectively allow and block fluid flow from each of said plurality of reagent injection channels to said plurality of secondary channels,
- a rinsing channel fluidly connected to each of said plurality of reagent injection channels, and
- a rinsing-channel valve in said rinsing channel to selectively allow and block fluid flow from each of said plurality of reagent injection channels to said rinsing channel,
- wherein said regent injection section has a first configuration in which said reagent injection valve in each of said plurality of reagent injection channels is open and said rinsing-channel valve in said rinsing channel is closed to provide a reagent in said plurality of secondary channels, and wherein said reagent injection section has a second configuration in which said reagent injection valve in each of said plurality of reagent injection channels is closed and said rinsing-channel valve in said rinsing channel is open such that rinsing fluid rinses each of said plurality of reagent injection channels by a flow of said rinsing fluid through each of said plurality of reagent injections channels and out said rinsing channel fluidly connected to each of said plurality of reagent injection channels.

24. A microfluidic chip according to claim 14, further comprising a section with detection channels wherein said detection channels are at least partially transparent for optical measurements.

* * * * *